United States Patent
Tseng

(10) Patent No.: US 7,701,543 B2
(45) Date of Patent: Apr. 20, 2010

(54) LAYOUT METHOD AND STRUCTURE FOR DRIVING CHIP OF AN LCD HAVING FIRST AND SECOND PIN GROUPS ONLY ALONG A HORIZONTAL DIRECTION OF THE LCD AND FIRST AND SECOND WIRING GROUPS FOR THE RESPECTIVE PIN GROUPS WITH WIRES OF THE SECOND GROUP HAVING A BEND INSIDE THE DRIVING CHIP

(75) Inventor: Ching-Wu Tseng, Taipei County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 501 days.

(21) Appl. No.: 11/625,335

(22) Filed: Jan. 21, 2007

(65) Prior Publication Data
US 2008/0100556 A1    May 1, 2008

(30) Foreign Application Priority Data
Oct. 30, 2006    (TW) ............................. 95140082 A

(51) Int. Cl.
*G02F 1/1345*    (2006.01)

(52) U.S. Cl. .................... 349/149; 349/151; 349/152
(58) Field of Classification Search .......... 349/149–152
See application file for complete search history.

(56) References Cited

U.S. PATENT DOCUMENTS

2004/0165138 A1*    8/2004    Hwang et al. ............... 349/152

* cited by examiner

*Primary Examiner*—John Heyman
(74) *Attorney, Agent, or Firm*—Winston Hsu

(57) ABSTRACT

A method of layout of a driving chip of an LCD, for reducing a size of the LCD, includes forming a first pin group including a plurality of pins utilized for outputting gate driving signals along a first direction, forming a second pin group including a plurality of pins utilized for outputting gate driving signals along the first direction, forming a first wire group including a plurality of wires each coupled between a pin of the first pin group and a panel of the LCD, and forming a second wire group including a plurality of wires each coupled between a pin of the second pin group and the panel, wherein each wire of the second wire group includes at least a bender formed inside the driving chip.

10 Claims, 7 Drawing Sheets

LAYOUT METHOD AND STRUCTURE FOR DRIVING CHIP OF AN LCD HAVING FIRST AND SECOND PIN GROUPS ONLY ALONG A HORIZONTAL DIRECTION OF THE LCD AND FIRST AND SECOND WIRING GROUPS FOR THE RESPECTIVE PIN GROUPS WITH WIRES OF THE SECOND GROUP HAVING A BEND INSIDE THE DRIVING CHIP

BACKGROUND OF THE INVENTION

1. Field of the Invention

The present invention relates to a method of layout of a driving chip of an liquid crystal display (LCD) and related LCD, and more particularly, to a layout method and related LCD capable of reducing the margin-area width of the bottom of the substrate of the LCD.

2. Description of the Prior Art

The advantages of a liquid crystal display (LCD) include light weight, less power consumption, and less radiation contamination. Thus, the LCD monitors have been widely applied to various portable electronic products, such as notebooks, PDAs, etc. Generally, the portable electronic products have to be designed as small as possible. Therefore, the prior art has already provided many layout methods for reducing layout sizes of the LCDs in the portable electronic products.

Please refer to FIG. 1. FIG. 1 is a schematic diagram of a prior art LCD 10 of a portable electronic device. The LCD 10 includes a substrate 100, a panel 1 02, and a driving chip 104. The panel 102 includes transistor switches controlled by the control signals of the driving chip 104. The driving chip 104, which is an integrated circuit (IC) integrated with a gate driver, a source driver, a power management chip, and a memory module, controls the panel 102 to display images. Both of the panel 102 and the driving chip 104 are formed on the substrate 100, and regions other than the panel 102 and the driving chip 104 in the substrate 100 are margin areas, which are usually utilized for wiring layout. Certainly, the smaller the margin areas occupy, the less the production cost is. Please refer to FIG. 2. FIG. 2 is a schematic diagram of prior art layout of the driving chip 104. In FIG. 2, a minimum height of the driving chip 104 is h1, and pins PL_1~PL_n and PR_1~PR_n of the driving chip 104, utilized for outputting gate driving signals, are set on the substrate 100 along a horizontal direction. Each of the wires RL_1~RL_n and RR_1~RR_n, utilized for transmitting the gate driving signals outputted from the pins PL_1~PL_n and PR_1~PR_n to the panel 102, is electronically coupled between one of the pins PL_1~PL_n and PR_1~PR_n and the panel 102. As shown in FIG. 2, each of the wires RL_1~RL_n and RR_1~RR_n begins from a pin, heads to the edge of the panel 102, and connects to a horizontal line of the panel 102 after a bend. In other words, each wire includes a bend on the substrate 100. As those skilled in the art recognized, in order to transmit signals effectively, bending angles of the wires RL_1~RL_n and RR_1~RR_n are restricted to be larger than a specific angle A. In such case, the distance between the panel 102 and the driving chip 104 must be larger than a minimum distance d1. If the distance between the panel 102 and the driving chip 104 is smaller than d1, the bending angles of the wires closer to the center of the driving chip 104, such as the wires RL_n, RL_(n-1), RR_n, and RR_(n-1), are smaller than the angle A, so that signals of the corresponding pins cannot be transmitted to the panel 102 efficiently. Therefore, the distance between the panel 102 and the driving chip 104 has to be larger than d1, and a width of the margin area below the panel 102 must be larger than (d1+h1).

Furthermore, please refer to FIG. 3. FIG. 3 is a schematic diagram of another prior art layout of the driving chip 104. In FIG. 3, the pins PL_1~PL_m and PR_1~PR_m of the driving chip 104 are set on the substrate 100 along a vertical direction, and the pins PL_(m+1)~PL_n and PR_(m+1)~PR_n are set on the substrate 100 along a horizontal direction. In comparison, layout of FIG. 3 moves a part of pins in FIG. 2 to the vertical direction of the driving chip 104. Hence, the number of pins along the horizontal direction of the driving chip 104 decreases, so that the minimum distance between the panel 102 and the driving chip 104 changes from d1 to d2. However, due to the pins PL_1~PL_m and PR_1~PR_m are set on the vertical direction of the driving chip 104, the height of the driving chip 104 changes from h1 to h2. In other words, reduction of width of the margin areas is limited. Thus, the layout shown in FIG. 3 is no great help for reducing the area of the substrate 100.

Therefore, no matter applying the layout of FIG. 2 or FIG. 3, the margin area of the bottom of the LCD 10 cannot be reduced effectively.

SUMMARY OF THE INVENTION

It is therefore a primary objective of the claimed invention to provide a method of layout of a driving Chip of an LCD and related LCD.

According to the claimed invention, a method of layout of a driving chip of an LCD, for reducing a size of the LCD, comprises forming a first pin group comprising a plurality of pins for outputting gate driving signals along a first direction; forming a second pin group comprising a plurality of pins for outputting gate driving signals along the first direction; forming a first wire group comprising a plurality of wires each coupled between a pin of the first pin group and a panel of the LCD; and forming a second wire group comprising a plurality of wires each coupled between a pin of the second pin group and the panel, wherein each wire of the second wire group comprises at least a bend formed inside the driving chip.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
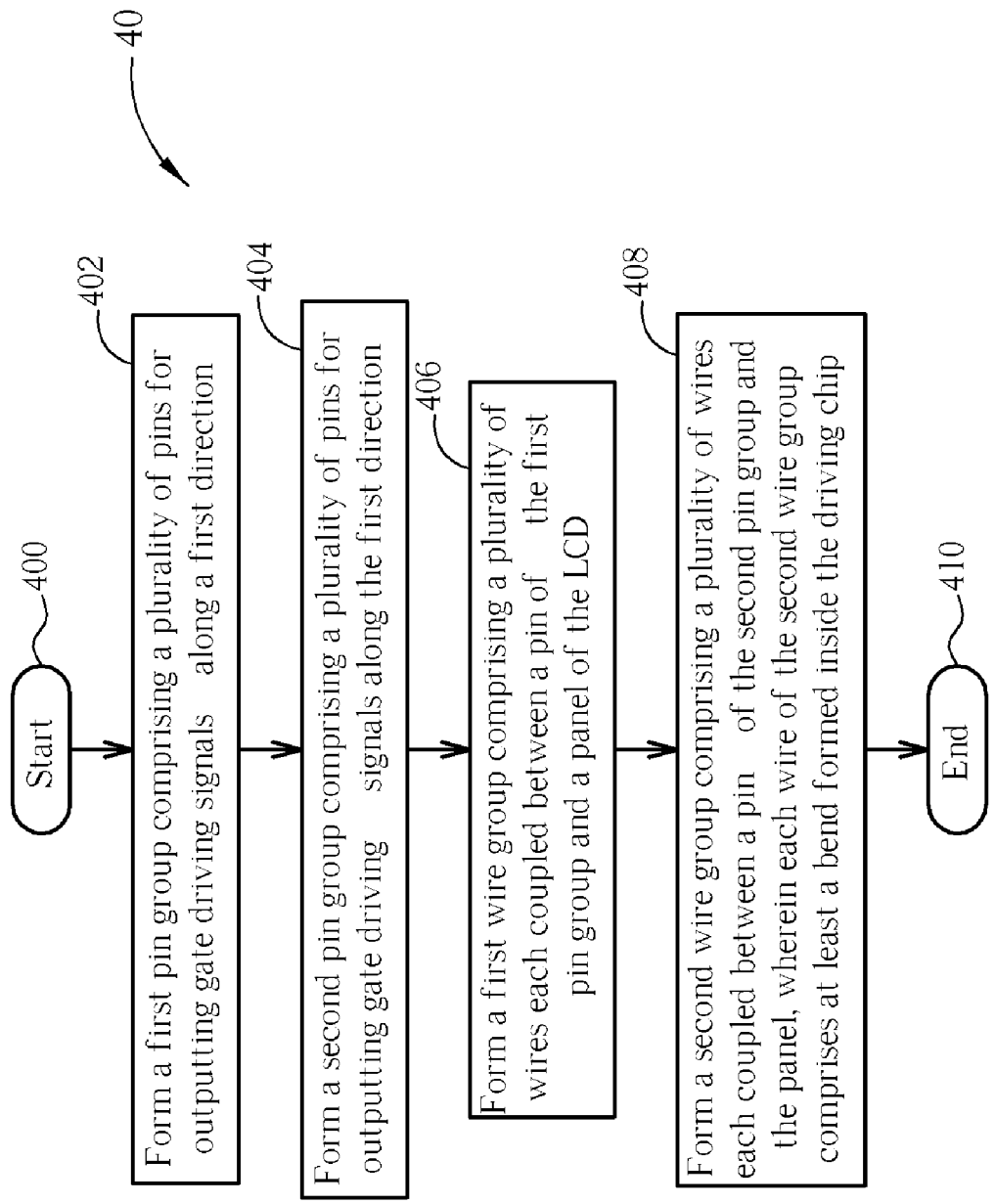
FIG. 4 is a schematic diagram of a layout process of a driving chip of an LCD according to an embodiment of the present invention.

Please refer to FIG. 4. FIG. 4 is a schematic diagram of a layout process 40 of a driving chip of an LCD in accordance with an embodiment of the present invention. The layout process 40 can reduce the size of the LCD, and comprises the following steps:

Step 400: start.

Step 402: form a first pin group comprising a plurality of pins for outputting gate driving signals along a first direction.

Step 404: form a second pin group comprising a plurality of pins for outputting gate driving signals along the first direction.

Step 406: form a first wire group comprising a plurality of wires each coupled between a pin of the first pin group and a panel of the LCD.

Step 408: form a second wire group comprising a plurality of wires each coupled between a pin of the second pin group and the panel, wherein each wire of the second wire group comprises at least a bend formed inside the driving chip.

Step 410: end.

In the process 40, the first wire group is coupled between the first pin group and the panel, while the second wire group is coupled between the second pin group and the panel. Each wire of the second wire group is extended from a pin of the second pin group inwards to the driving chip, through at least a bend, to an edge of the panel. Preferably, the first direction is a horizontal direction of the driving chip, and the second pin group is closer to a center of the horizontal direction of the driving chip than the first pin group. In other words, through the process 40, the output pins of the driving chip can be divided into two parts according to layout types: one is routed upwards through the plurality of the first wires, and the other is routed inwards into the driving chip through the plurality of the second wires. Therefore, the number of the pins routed upwards along the horizontal direction of the driving chip can be reduced, so that the distance between the panel and the driving chip can be decreased. Meanwhile, by the layout process 40, there is no need for setting pins along the vertical direction of the driving chip, so the height of the driving chip can further be decreased.

Figure 5:
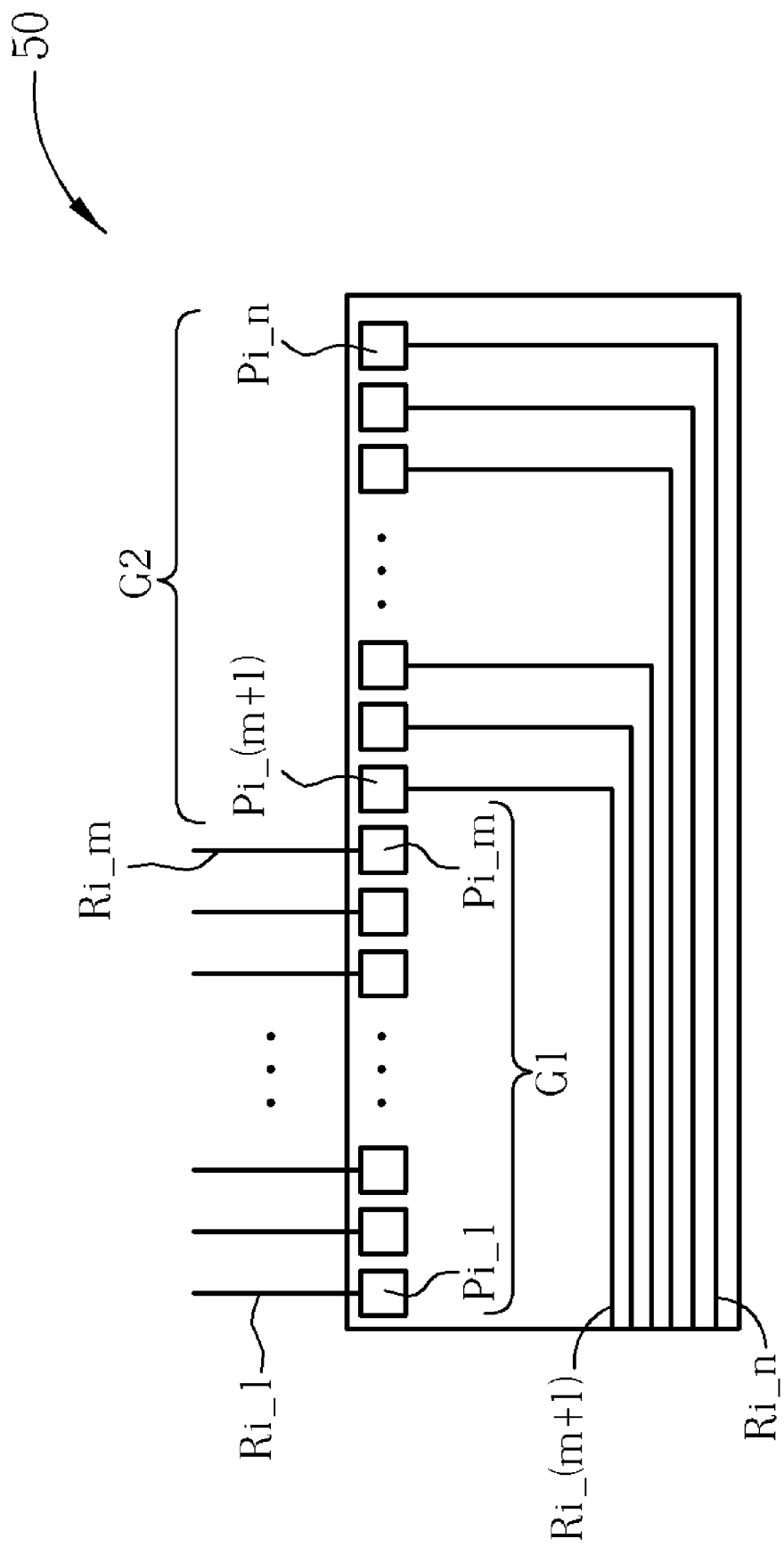
FIG. 5 is a schematic diagram of layout of a driving chip in an LCD according to an embodiment of the present invention.

Please refer to FIG. 5. FIG. 5 is a schematic diagram of layout of a driving chip 50 in an LCD according to an embodiment of the present invention. For simplicity, FIG. 5 only shows pins Pi_1~Pi_n of the driving chip 50 and corresponding wires Ri_1~Ri_n. The pins Pi_1~Pi_n can be divided into a first pin group G1 and a second pin group G2. The first pin group G1 includes the pins Pi_1~Pi_m, and the corresponding wires Ri_1~Ri_m are routed upwards directly. The second pin group G2 includes the pins Pi_(m+1)~Pi_n, and the corresponding wires Ri_(m+1)~Ri_n are routed inwards to the driving chip and each includes at least a bend.

Figure 1:
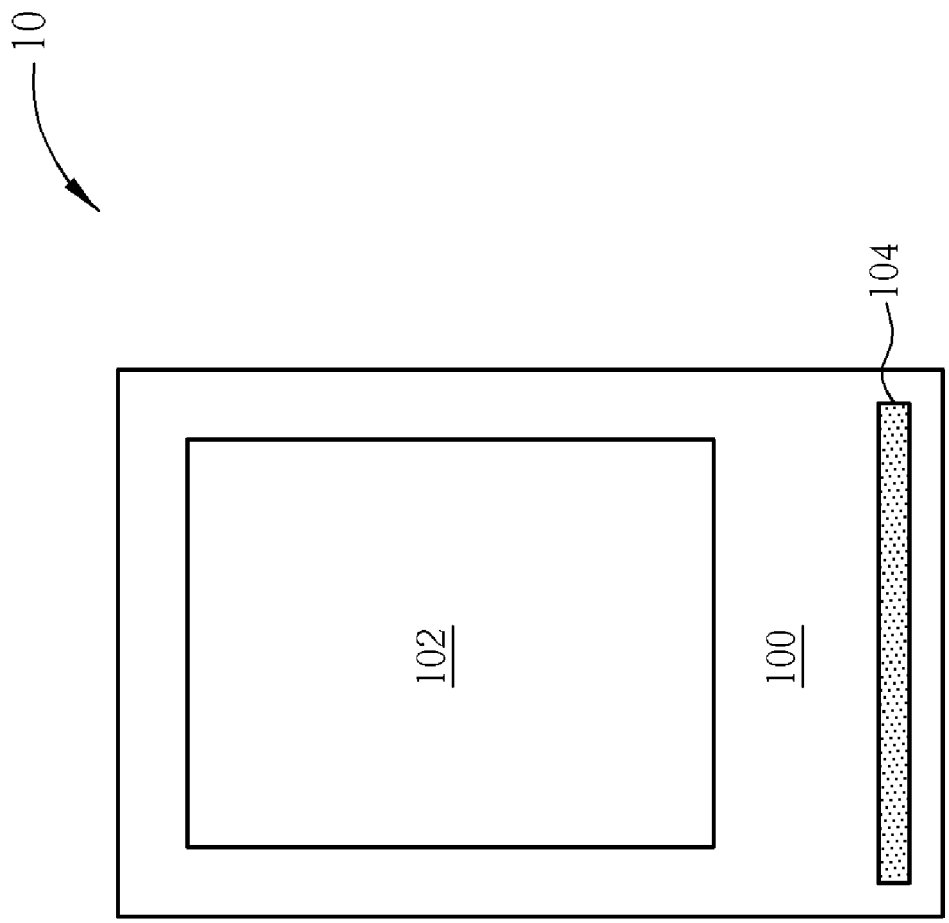
FIG. 1 is a schematic diagram of a prior art LCD used on a portable electronic device.
Figure 2:
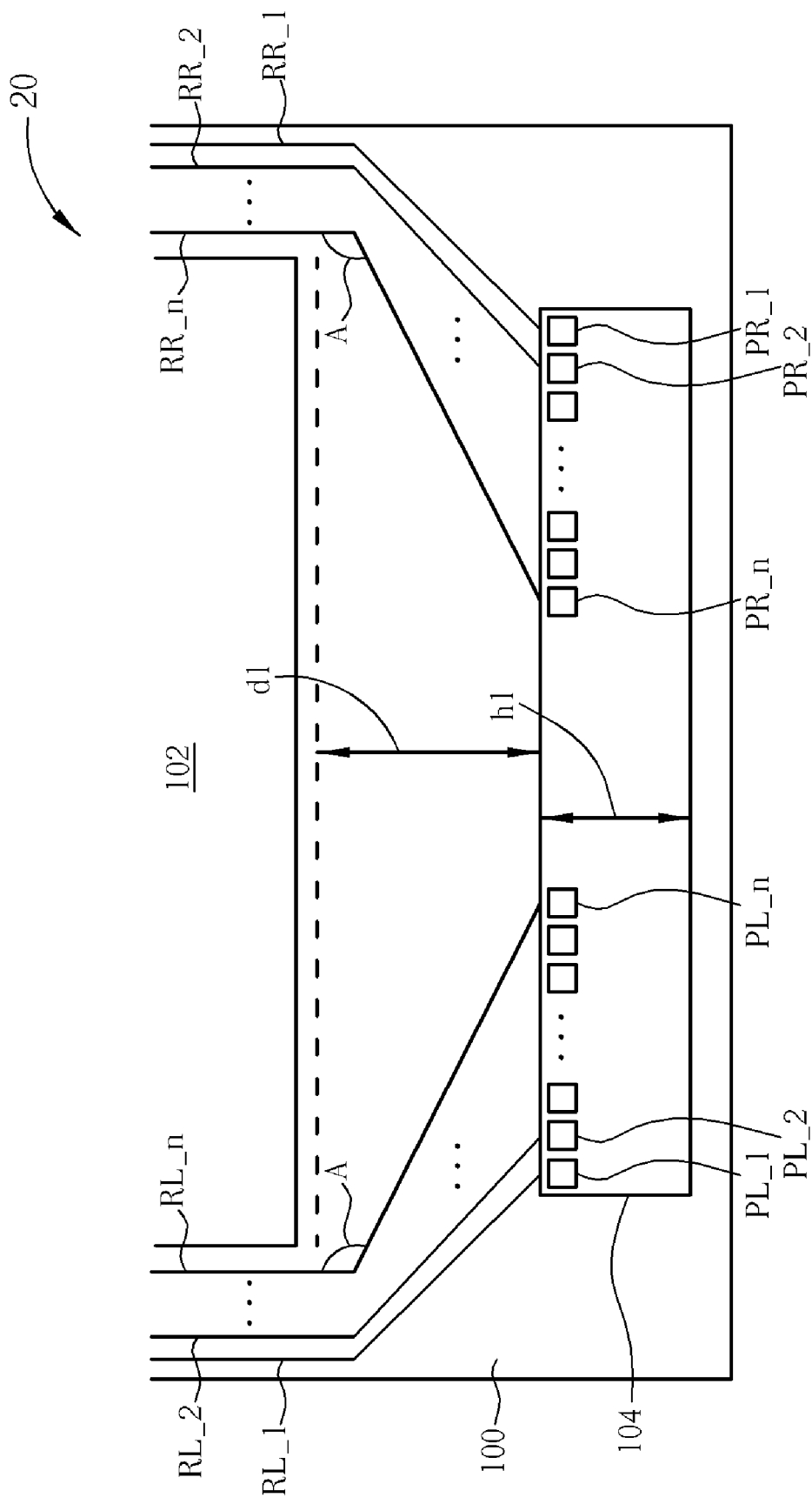
FIG. 2 is a schematic diagram of prior art layout of the driving chip.
Figure 3:
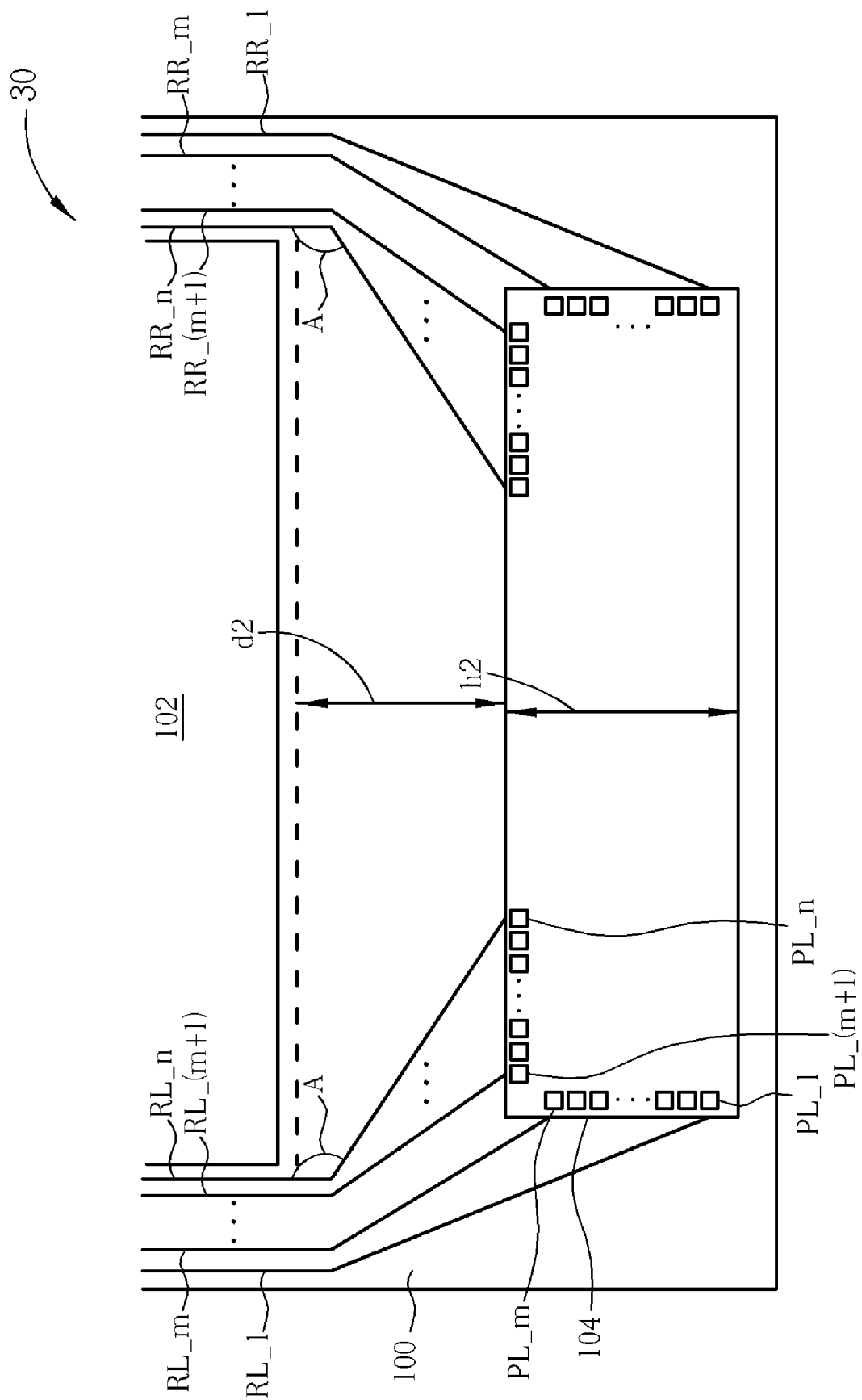
FIG. 3 is a schematic diagram of another prior art layout of the driving chip.
Figure 6:
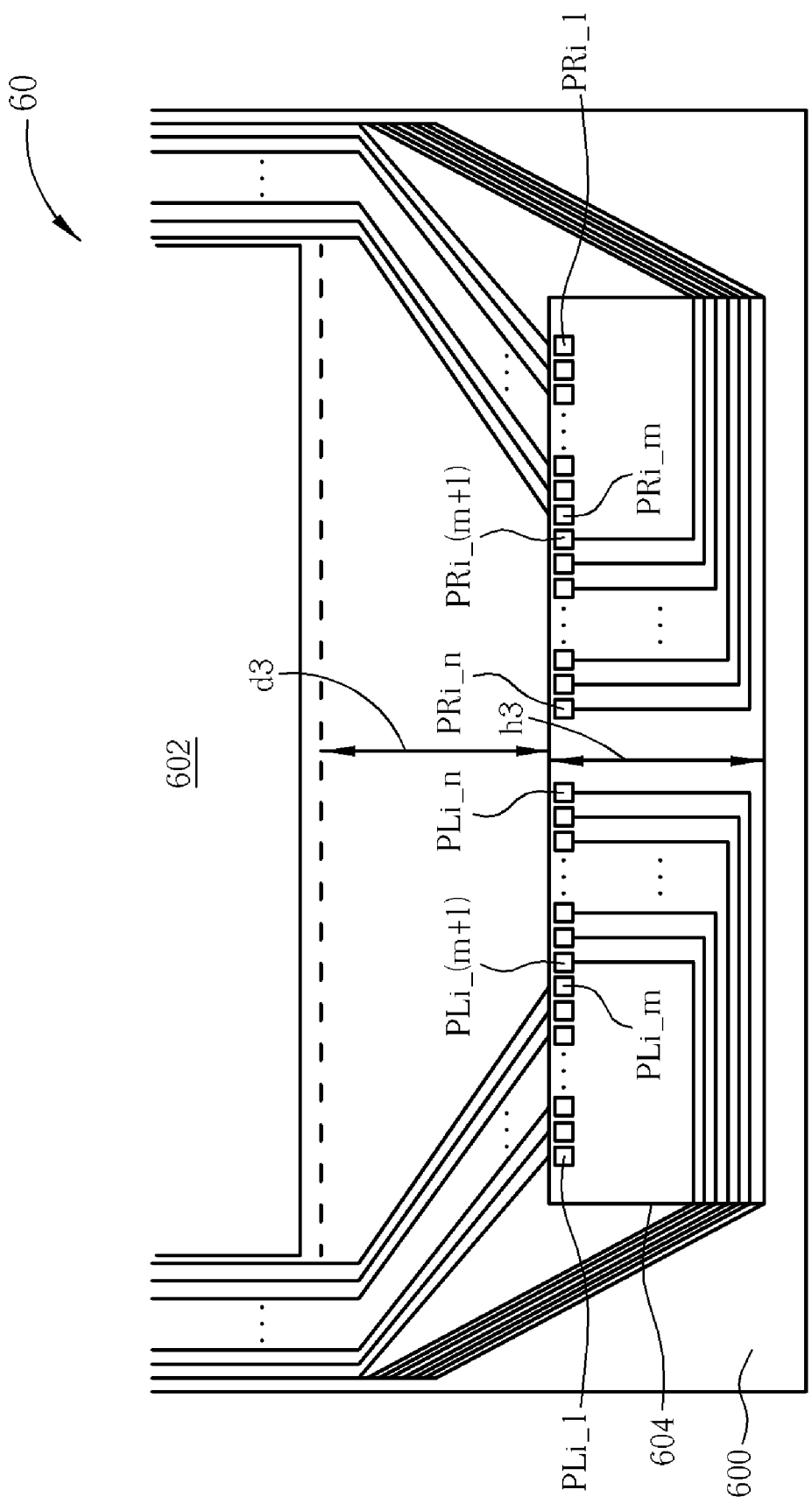
FIG. 6 is a schematic diagram of an LCD according to an embodiment of the present invention.

Therefore, through the layout of FIG. 5, the number of pins routed upwards can be reduced, and there is no need to set pins along the vertical direction of the driving chip 50. As a result, the distance between the panel and the driving chip can be decrease, and the height of the driving chip is not increased. For example, please refer to FIG. 6. FIG. 6 is a schematic diagram of an LCD 60 according to an embodiment of the present invention. The LCD 60 comprises a substrate 600, a panel 602, and a driving chip 604. Pins PLi_1~PLi_n and PRi_1~PRi_n of the driving chip 604, utilized for outputting gate driving signals, are formed on the substrate 600 along a horizontal direction. Each of wires RLi_1~RLi_n and RRi_1~RRi_n, utilized for transmitting the gate driving signals to the panel 602, is coupled between one of the pins PLi_1~PLi_n and PRi_1~PRi_n and the panel 602. As shown in FIG. 6, the wires RLi_1~RLi_m and RRi_1~RRi_m are routed upwards, while the wires RLi_(m+1)~RLi_n and RRi_(m+1)~RRi_n are routed inwards to the driving chip 604 with bends. In other words, the pins PLi_1~PLi_m and PRi_1~PRi_m can be considered as the first pin group G1 of the FIG. 5, and the pins PLi_(m+1)~PLi_n and PRi_(m+1)~PRi_n can be considered as the second pin group G2 of FIG. 5. In the present invention, all of the pins PLi_1~PLi_n and PRi_1~PRi_n of the driving chip 604 are formed along the horizontal direction, but the pins PLi_1~PLi_m and PRi_1~PRi_m are routed upwards. In this case, compared with the layout shown in FIG. 2, the present invention can shorten the distance between the driving chip 604 and the panel 602 (d3<d1). Meanwhile, compared with the layout shown in FIG. 3, the present invention does not increase the height of the driving chip 604 (h3<h1). Therefore, under the same display quality, the present invention can reduce the margin areas in the bottom of the LCD, so that the size of the LCD can be reduced.

Figure 7:
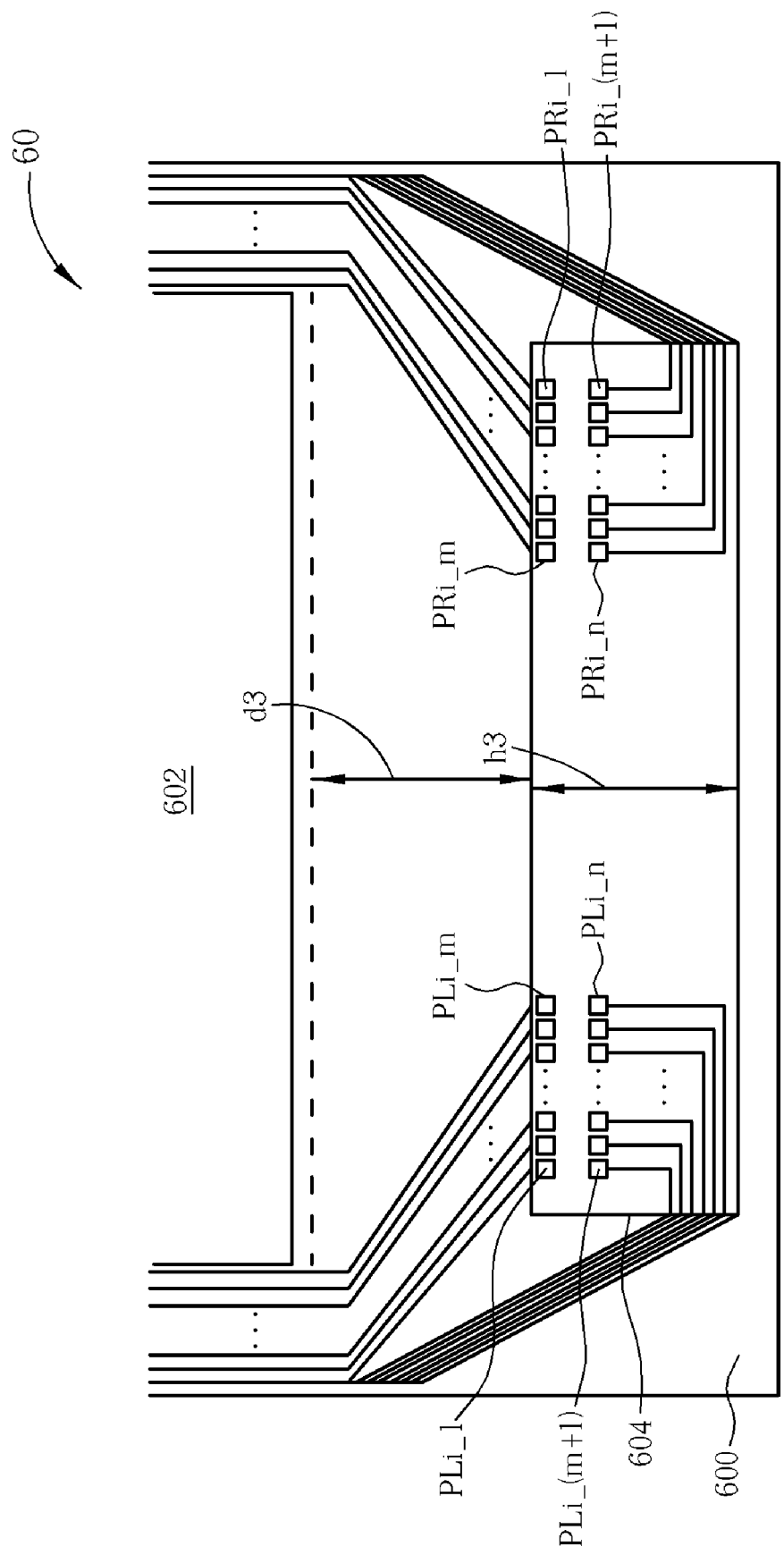
FIG. 7 is a schematic diagram of an LCD according to an embodiment of the present invention.

The LCD 60 shown in FIG. 6 is only an exemplary embodiment of the present invention, and those skilled in the art can make alternatives according to their demands. For example, the signals outputted from the pins PLi_1~PLi_n can be corresponding to the odd horizontal lines of the panel 602, and the signals outputted from the pins PRi_1~PRi_n can be corresponding to the even horizontal lines of the panel 602. Alternatively, the signals outputted from the pins PLi_1~PLi_n can be corresponding to the upper part of the panel 602, and the signals outputted from the pins PRi_1~PRi_n can be corresponding to the lower part of the panel 602. Besides, the bends inside the driving chip mentioned above can be formed in any shape, such as an arc, a right angle, or with more than one bend. Furthermore, as shown in FIG. 7, the pins PLi_(m+1)~PLi_n can be moved under the pins PLi_1~PLi_m, and the pins PRi_(m+1)~PRi_n can also be moved under the pins PRi_1~PRi_m, so that the wires inside the driving chip 604 can be reduced.

As mentioned above, using the present invention layout of the driving chip of the LCD, one part of the output pins are routed upwards, and the other part are routed inwards to the driving chip. Therefore, the layout can reduce the number of pins routed upwards along the horizontal direction of the driving chip, so as to reduce the distance between the panel and the driving chip. Meanwhile, there is no need to set pins along the vertical direction of the driving chip, so that the height of the driving chip can further be reduced. Furthermore, the wires inside the driving chip mentioned above can be formed on a conductive layer on the substrate 600, and is overlapped with the position of the driving chip. Certainly, the wires RLi_1~RLi_n and RRi_1~RRi_n can also be formed by the conductive layer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of layout of a driving chip of a liquid crystal display (LCD), for reducing a size of the LCD, comprising:
   forming a first pin group only along a first direction, the first pin group comprising a plurality of pins for outputting gate driving signals, wherein the first direction is a horizontal direction of the LCD;
   forming a second pin group only along the first direction, the second pin group comprising a plurality of pins for outputting gate driving signals;
   forming a first wire group comprising a plurality of wires each coupled between a pin of the first pin group and a panel of the LCD; and forming a second wire group comprising a plurality of wires each coupled between a pin of the second pin group and the panel, wherein each wire of the second wire group comprises at least a bend formed inside the driving chip.

2. The method of claim 1, wherein the second pin group is closer to a center of a horizontal side of the driving chip than the first pin group.

3. The method of claim 1, wherein forming the second pin group along the first direction is forming the second pin group along the first direction and paralleling the first pin group.

4. The method of claim 1, wherein each wire of the first wire group is extended from a pin of the first pin group to a margin of the panel and coupled to the panel.

5. The method of claim 1, wherein each wire of the second wire group is extended from a pin of the second pin group into the driving chip, through at least a bend, to a margin of the panel, and coupled to the panel.

6. A liquid crystal display (LCD) capable of reducing a layout size comprising:
  a substrate;
  a panel formed on the substrate; and
  a driving chip for driving the panel comprising:
    a gate driver for outputting gate driving signals;
    a first pin group comprising a plurality of pins, formed on the substrate only along a first direction and coupled to the gate driver, for outputting gate driving signals, wherein the first direction is a horizontal direction of the LCD;
    a second pin group comprising a plurality of pins, formed on the substrate only along the first direction and coupled to the gate driver, for outputting gate driving signals;
    a first wire group comprising a plurality of wires formed on the substrate and coupled between the first pin group and the panel; and
    a second wire group comprising a plurality of wires formed on the substrate and coupled between the second pin group and the panel, wherein each wire of the second wire group comprises at least a bend formed inside the driving chip.

7. The LCD of claim 6, wherein the second pin group is closer to a center of a horizontal side of the driving chip than the first pin group.

8. The LCD of claim 6, wherein the second pin group is parallel to the first pin group.

9. The LCD of claim 6, wherein each wire of the first wire group is extended from a pin of the first pin group to a margin of the panel and coupled to the panel.

10. The LCD of claim 6, wherein each wire of the second wire group is extended from a pin of the second pin group into the driving chip, through at least a bend, to a margin of the panel, and coupled to the panel.

* * * * *